March 20, 1951  G. H. PALMER  2,546,132
FRACTIONATION OF OLEAGINOUS MATERIALS
Filed May 16, 1947
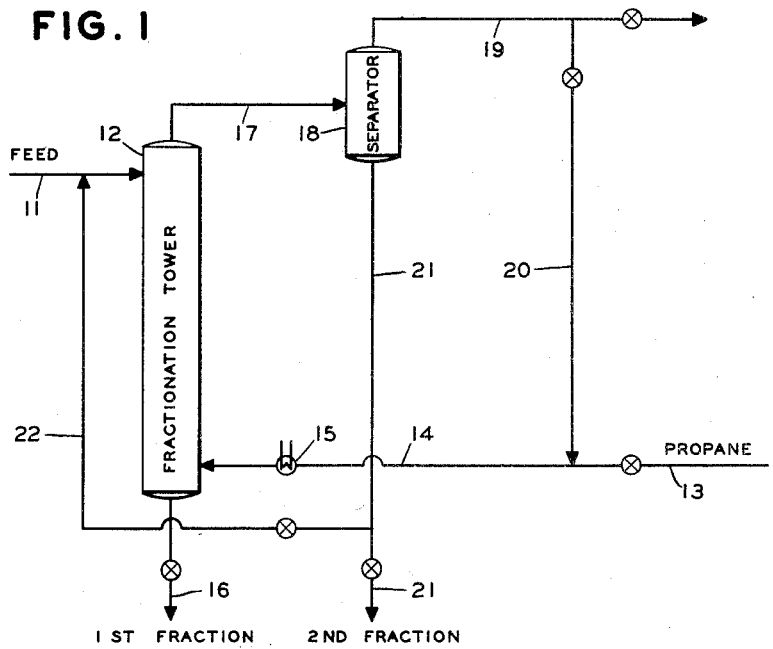
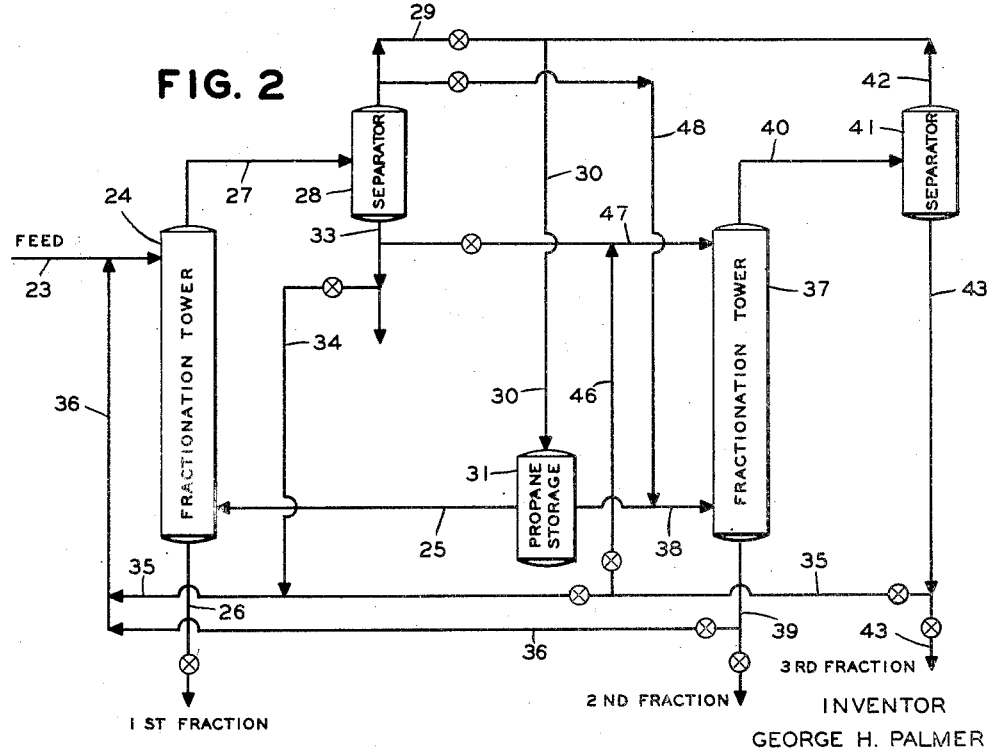
INVENTOR
GEORGE H. PALMER
BY E. F. Siebrecht
Youart H. Kerslake
ATTORNEYS Patented Mar. 20, 1951

2,546,132

UNITED STATES PATENT OFFICE 2,546,132

FRACTIONATION OF OLEAGINOUS MATERIALS

George H. Palmer, Fanwood, N. J., assignor to The M. W. Kellogg Company, Jersey City, N. J., a corporation of Delaware Application May 16, 1947, Serial No. 748,572

9 Claims. (Cl. 260—428.5)

This invention relates to an improved method for fractionating or extracting a desired extract from a fatty material with a low-boiling solvent, such as propane, by countercurrently contacting said material and said solvent in a fractionation tower. More particularly, the invention provides a new method for efficiently obtaining an extract phase substantially purer in the desired extract fraction and substantially less contaminated with raffinate fraction than is possible in ordinary counter-current extraction. Broadly the invention comprises mixing a quantity of the desired extract with the fatty material prior to the introduction of said material into the fractionation zone or immediately upon introduction therein, so that the counter-current contacting in the zone occurs with the solvent flowing upwardly past a downflowing phase containing a substantially higher percentage of extract than is present in the fatty material prior to intermixture. The result of the enrichment of the feed in this manner is that the solubility conditions within the extraction zone render the raffinate material substantially less soluble and the extract is of substantially higher purity in the desired extract than would have been the case if the fatty material were contacted without enrichment. The seeming loss involved in returning product material to be mixed with impure feed is compensated for by purity of product. Once equilibrium has been established a certain amount of extracted material is constantly recirculating and the cost of maintaining this recirculation is not excessive in comparison with the value of maintaining purity of extract on a high level.

The oils to be treated by the improved method of this invention include principally oils and fats of animal, vegetable and marine origin, which may be designated generally as fatty oils or fats. The invention also is applicable to the treatment of other mixtures of high molecular weight compounds, such as mineral oils. In carrying out the improved process such oils are fractionated into a plurality of fractions for a variety of purposes. These include the separation of the oil into a plurality of fractions, at least one of which is superior in some respect to the original oil, and the treatment of the oil to remove minor impurities. For example, a fatty oil may be treated to separate a fraction concentrated in fatty acids, to separate a fraction in which the color bodies are concentrated, or to separate a fraction in which desirable ingredients, such as oil soluble vitamins, are obtained in high concentration. For example, a fish oil, such as a fish liver oil, may be treated to separate a small fraction containing, in high concentration, the vitamins contained in the original oil. The remainder of the fish oil may be further fractionated into a plurality of fractions having different properties, and a small fraction in which the color bodies of the oil are concentrated also may be separated.

Solvents which may be used in the process include low-boiling compounds which are inert under the conditions of the countercurrent extraction, and which do not react under those conditions with the constituents of the crude oil. Those solvents which have been found to be particularly useful in the present invention include low-boiling hydrocarbons such as methane, ethane, propane, the butanes, the pentanes and the corresponding olefins as well as mixtures thereof such as a mixture of methane and normal butane. Other solvents include other organic compounds such as halogenated hydrocarbons including dichlordifluormethane, dimethyl ether, and methyl fluoride. Still other solvents which may be used are carbon dioxide and ammonia. In general, it may be said that inert and nonreactive compounds having critical temperatures not substantially higher than 450° F. and in which at least one component of the crude oil to be treated is soluble at temperatures above about 100° F. below the critical temperature, may be employed satisfactorily and are to be included within the term "low-boiling solvent." The preferred solvents are those having a critical temperature less than 325° F. such as normally gaseous compounds which have the desired solvent power when maintained in the liquefied state, for example, propane.

In general the improved process involves combining with an oil to be fractionated a previously extracted oil representing a concentration of the components of the raw oil which are most readily soluble in the low-boiling solvent, and then subjecting the combined oil to countercurrent extraction with the solvent under a pressure effective to maintain the solvent in liquid form and at temperatures in the range of temperatures in which solubility decreases with rising temperature. The final extract phase obtained is treated to separate at least a part of the solvent, and a portion of the extract oil thus obtained is recombined with additional raw oil to be fractionated.

The fractionating operation is carried out in one or more vertical fractionating towers suitably equipped with means for promoting the intimate contact of two counter-flowing streams of solvent and oil. The oil to be fractionated and the previously extracted oil are introduced at the same level near the top of a fractionating tower and the solvent, such as propane, is introduced at a point near the bottom of the tower. The raw oil and the previously extracted oil may be mixed outside the tower and charged to the tower as a mixture, or these oils may be separately charged to the tower at the same level whereby they come into contact with each other and with the propane substantially simultaneously.

As the propane ascends the tower it mixes with the descending oil, and dissolves those components of the oil which, under the conditions of temperature and pressure used, are soluble in the propane. Other components of the feed which are not dissolved by the up-flowing propane, are withdrawn from the bottom of the tower. The propane extract containing dissolved portions of the oil is subsequently treated so as to remove a portion or all of the propane from the oil dissolved therein. According to the present invention, oil thus recovered from the extract is mixed with fresh feed being introduced into the top of the fractionating tower as mentioned above. Accordingly, the feed material is continuously enriched with the more soluble components and when the system has reached equilibrium, the overhead fraction from the fractionation tower will contain an exceedingly high proportion of the soluble components.

In order to more clearly describe the present invention, reference will be made to the accompanying drawing which forms a part of the present specification.

Fig. 1 represents a flow diagram of one system embodying the present invention, and Fig. 2 represents a flow diagram of a modified system for carrying out the present invention.

The representation of equipment in the drawing is entirely diagrammatic, and the pumps, compressors, heaters, coolers, valves, and other conventional pieces of equipment necessary to maintain the operating conditions are omitted for simplicity of presentation.

According to Fig. 1, the crude oil feed is introduced through line 11 to a point near the top of fractionation or extraction tower 12. Propane is introduced through lines 13 and 14, which may be provided with a heater 15, to a point near the bottom of fractionation tower 12. As the oil feed descends through the fractionation tower and the propane ascends therethrough, a countercurrent extraction of the oil is effected whereby the more soluble components of the crude oil are dissolved in the propane. The undissolved residual oil flows to the bottom of the fractionation tower 12 and is withdrawn as a first fraction through line 16. The propane phase containing the more soluble components of the oil is withdrawn from the top of fractionation tower 12 through line 17 and is introduced into a separator 18 for the removal of the propane from the more soluble oil components. The pressure on the propane phase in separator 18 is reduced substantially in order to cause vaporization of at least a portion of the propane which may be removed overhead through line 19 and heat may be applied to assist vaporization. This recovered propane may, if desired, be returned to the system through lines 20 and 14. The lower phase from separator 18 is withdrawn through line 21 and comprises a second oil fraction. A portion of this second fraction is returned to feed line 11 through line 22. If desired, the returned portion may be introduced directly into the tower 12 at a point below line 11, instead of into line 11 as shown on the drawing. In this way, the descending oil in the fractionation tower 12 is enriched in those components of the oil which are more soluble in the propane so that the less soluble components are rejected.

The pressure maintained in tower 12 is selected primarily to maintain the contents of the tower in liquid condition and provide sufficient margin over the minimum to permit slight adjustments in pressure during the operation. The maximum temperature employed in tower 12 ordinarily is not higher than a few degrees above the critical temperature of the solvent. In most operations the maximum temperature employed in tower 12 is somewhat lower than such critical temperature. The operating temperature is controlled ordinarily by controlling the temperature of the oil and propane about to be charged to the tower. However, heating and cooling means may be installed in the tower to control temperature conditions therein. The critical temperature of propane is 206.3° F., whereas the critical pressure is 617.4 pounds per square inch. When using propane as the solvent an operating pressure of 600–700 pounds per quare inch is satisfactory.

The ratio of propane to raw oil charged to tower 12 ordinarily is at least 5:1, and ratios of 10:1 and higher are preferred. The temperature and pressure maintained in tower 12 and the ratio of product oil recycled through line 22 to raw oil feed are regulated whereby the combined oil feed and propane in tower 12 are only partly miscible and form two phases. The extract phase contains all but a small proportion of the propane and that proportion of the oil which it is desired to extract. The other phase contains only a small proportion of the propane and a larger proportion of the oil in a propane: oil ratio much lower than that of the propane phase. This phase, which is substantially heavier than the propane phase, and thus flows downwardly in the tower, is designated as the oil phase, or the lower phase, or the raffinate phase.

The operating conditions are maintained to produce in the bottom of tower 12, under equilibrium conditions, a lower phase which contains a quantity of oil equivalent to that proportion of the raw charge oil which it is desired to recover in the bottom fraction. The bottom fraction represents a concentration of the less soluble components of the charge oil and is substantially free of the more soluble components of the charge oil which it is desired to recover in the overhead fraction through line 17. Such sharp fractionation results from the combined effect of the product recycling through line 22 and the intimate countercurrent contact of the counter-flowing phases in tower 12.

In tower 12 conditions are maintained whereby the propane stream entering the tower through line 14 strips from the lower phase substantially all the more soluble components it is desired to include in the overhead product. In effecting such stripping the propane also dissolves components which it is desired to exclude from the overhead product. As the propane stream, containing dissolved therein such undesired less soluble components, flows upwardly in tower 12, it contacts upper phase material which is more and more concentrated in the relatively soluble components desired in the overhead product. These are preferentially dissolved in the propane phase with concurrent precipitation of less soluble components which combine with and form a part of the lower phase as it flows down the tower.

The recycling or refluxing ratio, which is the ratio of oil recycled through line 22 to raw oil charged through line 11, is varied in accordance with the conditions employed, the type of oil being processed, and the sharpness of fractionation desired. This ratio may vary within a wide range, for example, from 0.1:1 to 10:1 or higher.

In establishing equilibrium conditions in tower 12 the entire upper phase product may be recycled through line 22 until the quality of the oil fraction recovered at 18 is satisfactory. Thereafter a portion of the oil fraction from 18 may be withdrawn from the process through line 21 as a product. Alternatively, a proportion of the oil fraction at 18 substantially greater than that desired at equilibrium conditions may be recycled when starting up and this may be progressively decreased, as equilibrium conditions are approached. In place of, or in addition to, the foregoing methods of starting up, tower 12 may be placed in operation at a relatively high temperature which may be progressively lowered to the desired final operating temperature as the equilibrium composition of the product at 18 is approached.

Fig. 2 presents diagrammatically an arrangement of apparatus for separating a fatty oil into three or more fractions, in accordance with the improved process. In Fig. 2 there are provided two fractionating towers, each of which is generally similar in construction and function to tower 12 of Fig. 1.

In the arrangement of Fig. 2, the crude oil feed is introduced through line 23 into fractionation tower 24 and propane is introduced near the bottom of tower 23 through line 25. The less soluble components are withdrawn from the bottom of tower 24 through line 26 as a first raffinate product. The overhead phase consisting of propane and the more soluble components of the oil passes through line 27 into separator 28 where a first extract fraction is separated, usually by vaporization of propane. The recovered propane is passed through lines 29 and 30 to a propane storage vessel 31 from which it may be passed through line 25 to the bottom of fractionation tower 24, thus completing the cycle. The extract fraction, which may contain residual propane, is withdrawn from the bottom of separator 28 through line 33. A portion of this fraction is transferred through line 47 into the top of a second fractionation tower 37. Propane is introduced near the bottom of fractionation tower 37 through line 38 to effect a countercurrent extraction of the oil introduced at the top thereof. The temperature in fractionation tower 37 ordinarily is maintained higher than that in tower 24 in order to effect a separation between the components of the oil being fed to tower 37. Those components of the oil which are less soluble in the propane in tower 37, are withdrawn through line 39 as a second raffinate fraction from the bottom of said tower. The propane phase containing the more soluble components of the oil under those conditions existing in tower 37, is removed from the top of said tower through line 40 and passed to separator 41 where propane is separated, ordinarily by vaporization, and a second extract fraction is retained. The propane is passed through lines 42 and 30 to propane storage tank 31 for reuse in the system. The second extract fraction which may contain residual propane, is withdrawn from separator 41 through line 43.

In accordance with one modification of the invention a portion of the second raffinate fraction withdrawn from tower 37 through line 39 is returned through line 36 to the oil feed point of tower 24 to enrich the feed to that tower in the relatively more soluble components of the oil. This is effected by diverting a portion of the material flowing through line 39 through line 36, which connects with line 23.

In accordance with another modification of the invention a portion of the second extract fraction recovered at 41 may be recycled to enrich the oil feed to the process. This may be accomplished by diverting from line 43 a portion of the fraction flowing therethrough through line 35, which connects line 43 with line 36.

In accordance with another modification of the process a portion of the second extract fraction from 41 may be employed to enrich the oil feed to tower 37. Recycle oil for that purpose may be diverted from line 43 and passed through lines 35 and 46 to line 47. By this means the oil charged into the top of tower 37 is enriched in more soluble components thereof.

In accordance with another modification of the process a portion of the first extract fraction recovered at 28 may be recycled to enrich the oil feed to tower 24. For this purpose a portion of the oil fraction flowing through line 33 may be diverted through line 34, which connects with line 35, whereby the oil flows from line 33 through lines 34, 35, 36 and 23 into the top of tower 24.

In any of the foregoing modifications of the invention the oil charge for tower 37 is prepared ordinarily by the evaporation of a substantial amount of the propane in separator 28 to leave a residual oil fraction which may contain propane in a far smaller proportion than the propane phase flowing through line 27. This method of operation requires supplying to the bottom of tower 37 a separate propane stream. In order to minimize the amount of evaporation and condensation required in the process, the oil phase in separator 28 may be obtained by heating, without reduction in pressure, the propane phase introduced through line 27 to effect a separation of liquid phases in separator 28. If the temperature in separator 28 is raised near or above the critical temperature of the solvent the lower phase separated in 28 contains most, if not all, of the first extract fraction of the oil charge. This fraction may then be withdrawn through line 33 and handled in the manner described above. The upper liquid phase obtained in separator 28 contains, at most, a small amount of oil dissolved in the propane and this phase may be charged, with appropriate temperature adjustment, to the bottom of tower 37 together with any additional propane which it may be desired to introduce from propane storage at 31. For this purpose line 48 is provided to connect line 29 with line 38.

Any, or all of the foregoing modifications may be employed in combination. For example, when enriching the feed to tower 37 by recycling of a portion of the second extract fraction from 41, it may be desirable to simultaneously enrich the feed to tower 24 by recycling a portion of the second raffinate fraction from 39, or a portion of the first extract fraction from 33. Alternatively, the feed to tower 24 may be enriched by simultaneous recycling of a portion of the first extract fraction from 33 and a portion of the second raffinate fraction from 39.

In accordance with another preferred modification of the invention the feed to tower 24 may be enriched with a portion of the second raffinate fraction from line 39 while the oil charge to tower 37 is prepared by heating the propane phase in separator 28 to obtain two liquid phases and while the feed thus obtained for tower 37 is enriched by the recycling of a portion of the second extract fraction from line 43.

As stated above, any of the modifications may be employed in combination with one or more of the other modifications, and it is evident that the improved process thus provides many operating variables which render it adaptable to the treatment of a variety of oils to effect separation thereof into desired fractions.

For a specific example of the use of the process of Fig. 2, reference may be made to the separation of a crude soybean oil into three or more fractions. For example, tower 24 may be operated under such conditions that a major proportion of the soybean oil is withdrawn in the propane phase through line 27. A small percentage of the oil from about 1 to 2% containing substantially all of the color bodies, phosphatides, and mucilaginous materials, may be withdrawn from the bottom of said tower through line 26. The decolorized oil after substantial or partial removal of the propane in separator 28 is passed into the top of fractionation tower 37 which is operated under such conditions that substantially all of the glyceride oils will be withdrawn from the bottom of the tower through line 39. This fraction may be used as an edible oil such as a salad oil. The overhead propane phase which is withdrawn through line 40, contains various unsaponifiable materials such as the sterols, tocopherols, stearins and some of the free fatty acids. These may be removed as the third fraction through line 43 for further use.

The exact temperatures and pressures to be used in the fractionation towers will vary not only according to the type of crude oil which is being refined, but also according to the type of solvent being used. Another factor which will determine the conditions of temperature and pressure would be the type of products desired and the degree of fractionation. Furthermore, the reflux ratio can be varied depending on the sharpness of the fractions desired, a high ratio being necessary for very sharp fractionation. It is possible to operate any of the fractionation towers at constant temperatures from top to bottom in which case the separation or fractionation would be effected only by the countercurrent extraction of the oil by the solvent. On the other hand, it may be desirable to operate one or more of the fractionation towers with a temperature gradient, that is to say, the top of the fractionating tower may be at a higher temperature than the bottom and under these conditions the tower would also serve to rectify the extract or propane phase as it rises through said tower. A temperature gradient of from 1 to 15° is generally sufficient.

As stated above, the improved process is particularly suitable for the fractionation of fish oils and fish liver oils to prepare a vitamin concentrate. For a specific example reference may be made to the treatment of a dogfish liver oil having an initial vitamin A concentration of about 10,000 international units per gram. In this operation the dogfish liver oil was treated in a fractionating zone equivalent to the single tower operation illustrated in Fig. 1. The fractionating zone was operated at temperatures which were substantially uniform throughout the fractionating zone and maintained at levels effective to reject to the raffinate phase about 94 percent of the oil charge. Inasmuch as it was desired to effect a high concentration of the vitamin content of the charge oil a portion of the overhead product was recycled to the process in the necessary amounts. The operating conditions and the results obtained are summarized in the following table, in which the runs represent two stabilized periods of operation at different conditions:

Table

| Run | 1 | 2 |
|---|---|---|
| Propane: Oil Feed Vol. Ratio | 50:1.0 | 98.7:1.0 |
| Recycled Oil: Feed Wt. Ratio | 1.59:1.0 | 2.45:1.0 |
| Recycled Oil: Feed Vol. Ratio | 1.62:1.0 | 2.39:1.0 |
| Propane: Total Oil Vol. Ratio | 19.1:1.0 | 29.0:1.0 |
| Temp. ° F | 177 | 181 |
| Vitamin A Conc. (Unsaps.): | | |
| Fresh Feed | 10,160 | 10,275 |
| Product (Overhead) | 94,000 | 126,000 |
| Number of Concentrations | 9.25 | 12.3 |
| Vitamin Recovery in Product per cent | 50.0 | 76.1 |
| Charge oil in Product do | 5.5 | 6.1 |

The vitamin concentrations of the charge oil and the product oils given in the foregoing table were determined by spectrographic analysis of the unsaponifiable portion of these oils. In run 1 the overhead product contained vitamin A in a concentration 9.25 times that of the charge oil, and the overhead product represented a recovery of 50 percent of the vitamin A content of the charge oil. In order to increase the concentration and the recovery of vitamins in the overhead product the ratio of propane to charge oil and the ratio of recycled oil to feed oil were increased in run 2. The increased propane:oil ratio was necessary since the equipment employed in the operation did not provide a sufficient length in the stripping zone to effect satisfactory stripping of the vitamin content from the lower phase when employing the propane:oil ratio of run 1. Under the conditions of run 2 the vitamin recovery in the overhead product was increased to 76.1 percent, and the product thus obtained contained vitamin A in a concentration 12.3 times that of the charge oil. To balance the higher propane:oil ratio employed in run 2, the temperature of the fractionating zone was increased from 177° F. to 181° F. to maintain the desired distribution of the charge oil between the phases.

Having now described my invention and ways of carrying out the same, what I claim is:

1. In a continuous process for extracting a desired extract from an oleaginous material with a solvent having a critical temperature below about 450° F. by counter-currently contacting said material with said solvent in a vertically extended fractionation zone at temperatures in the paracritical range between about 100° F. below the critical temperature of the solvent and approximately critical temperature, the improvement which includes the steps of: introducing a mixture of said fatty oleaginous material and said desired extract into the upper end of said zone in the form of a heavy downflowing oil phase; introducing solvent at the lower end of said fractionation zone to counter-currently contact said downflowing phase and form an upflowing extract phase; withdrawing an extract phase containing the desired extract from the upper end of said fractionation zone and separating from said extract phase a substantially heavier oil-rich phase; and recycling part of said oil-rich phase to be mixed with said oleaginous material at the upper end of said zone.

2. A method as claimed in claim 1 in which said oil phase is separated from said extract phase by heating said extract phase.

3. In a process for fractionating an oleaginous material with a solvent having a critical temperature below about 450° F. by counter-currently contacting said material with said solvent at temperatures in the paracritical range between about 100° F. below the critical temperature of the solvent and approximately critical temperature, the improvement which includes the steps of: introducing said material into the upper end of a first vertically extended fractionation zone in the form of a heavy downflowing oil phase; introducing solvent at the lower end of said fractionation zone to counter-currently contact said downflowing phase and form an upflowing extract phase; withdrawing primary extract and raffinate phases from the upper and lower ends respectively of said first fractionation zone and recovering an extract from said primary extract phase; introducing said extract into the upper end of a second vertically extended fractionation zone, and additional solvent into the lower end of said second zone; withdrawing secondary extract and raffinate phases from the upper and lower ends respectively of said second zone and recycling a portion of said secondary raffinate phase to be mixed with said oleaginous material at the upper end of said first fractionation zone.

4. In a process for fractionating an oleaginous material with a solvent having a critical temperature below about 450° F. by counter-currently contacting said material with said solvent at temperatures in the paracritical range between about 100° F. below the critical temperature of the solvent and approximately critical temperature, the improvement which includes the steps of: introducing said material into the upper end of a first vertically extended fractionation zone in the form of a heavy downflowing oil phase; introducing solvent at the lower end of said fractionation zone to counter-currently contact said downflowing phase and form an upflowing extract phase; withdrawing primary extract and raffinate phases from the upper and lower ends respectively of said first fractionation zone and adjusting the physical condition of said primary extract phase to precipitate an oil-rich phase substantially heavier than said primary extract phase; introducing said oil-rich phase into the upper end of a second vertically extended fractionation zone, and additional solvent into the lower end of said second zone; withdrawing secondary extract and raffinate phases from the upper and lower ends respectively of said second zone and adjusting the physical condition of said secondary extract phase to precipitate second oil-rich phase substantially heavier than said secondary extract phase; and recycling a portion of said second precipitated oil-rich phase to be mixed with said oleaginous material at the upper end of said first fractionation zone.

5. A method as described in claim 4 in which at least one of said oil-rich phases is precipitated by heating the extract phase from which it is obtained.

6. A method as described in claim 3 in which said second vertically extended fractionation zone is operated at a substantially higher temperature than said first zone.

7. The method as claimed in claim 1 in which said oleaginous material is a vitamin-containing oil and said desired extract is more highly concentrated in vitamins than said oleaginous material.

8. A process as claimed in claim 1 wherein said solvent comprises a liquefied normally gaseous hydrocarbon.

9. A process as claimed in claim 1 wherein said solvent comprises propane.

GEORGE H. PALMER.

REFERENCES CITED

The following references are of record in the file of this patent:

UNITED STATES PATENTS

| Number | Name | Date |
|---|---|---|
| 2,081,719 | Van Dijck | May 25, 1937 |
| 2,139,392 | Tijmstra | Dec. 6, 1938 |
| 2,219,652 | Hixson et al. | Oct. 29, 1940 |
| 2,247,496 | Hixson et al. | July 1, 1941 |
| 2,329,889 | Ewing | Sept. 21, 1942 |
| 2,346,491 | Kirsted | Apr. 11, 1944 |
| 2,432,021 | Larner | Dec. 2, 1947 |

OTHER REFERENCES

Bailey-Industrial Oil & Fat Products (1945), Interscience Pub. Co., pg. 656.